Feb. 22, 1927.
V. LOCKWOOD
1,618,936
CLUTCH HOLDING DEVICE
Filed Aug. 14, 1926
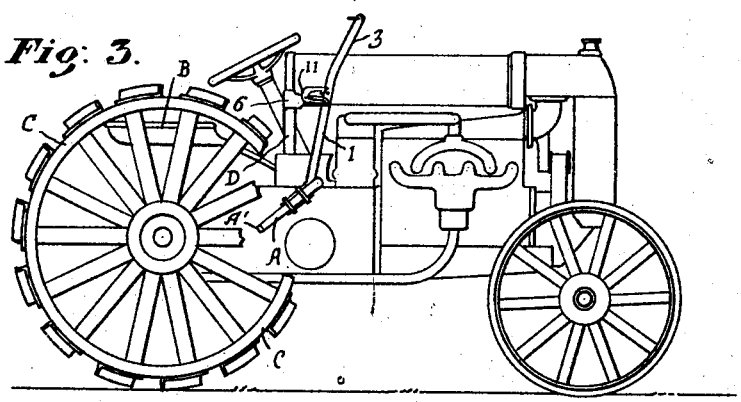
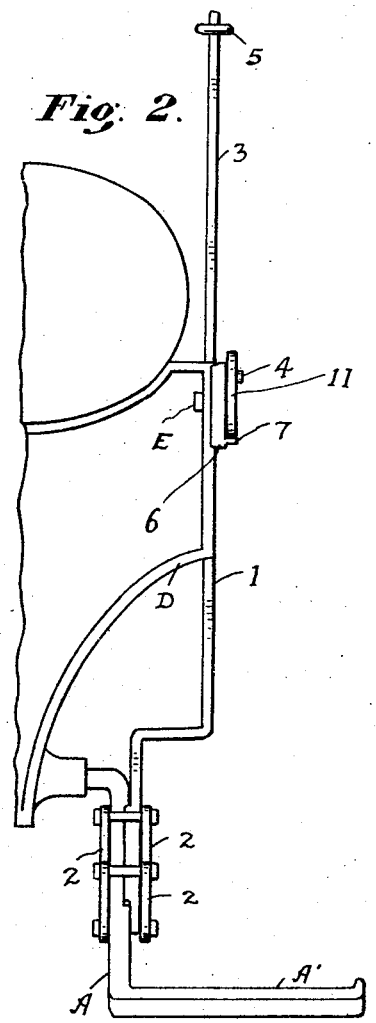
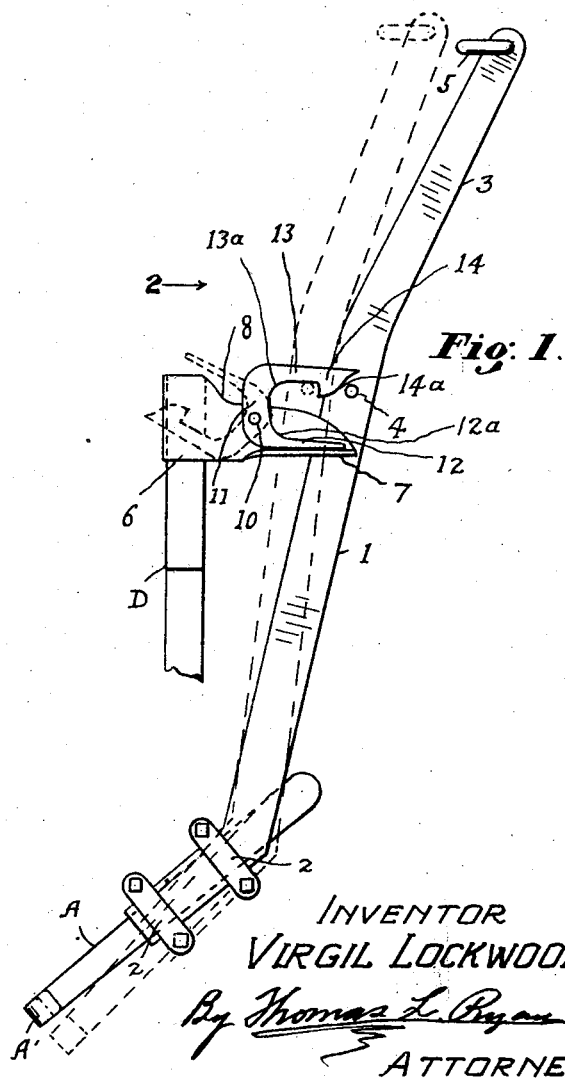
INVENTOR
VIRGIL LOCKWOOD
By Thomas L. Ryan
ATTORNEY.

Patented Feb. 22, 1927.

1,618,936

UNITED STATES PATENT OFFICE.

VIRGIL LOCKWOOD, OF BLUFFTON, INDIANA, ASSIGNOR OF ONE-HALF TO EDWIN LOCKWOOD AND JOSEPH P. LOCKWOOD, BOTH OF KEYSTONE, INDIANA; CHARLES E. DYSON, OF PETROLEUM, INDIANA; AND CECIL C. LOCKWOOD, OF MONTPELIER, INDIANA.

CLUTCH-HOLDING DEVICE.

Application filed August 14, 1926. Serial No. 129,246.

This invention relates to improvements in control devices for auto-motive vehicles, with reference especially to tractors, and in whose structure are included the usual internal combustion engine, clutch mechanism, power transmission device, and differential gearing, and the several control levers therefor.

The tractor, while being used mainly as a vehicle of transportation, and for the drawing of farm implements, is also capable of being used as a stationary power plant for the driving of machinery of various kinds. In a range of use so extensive, it is desirable that the operating of the driven machinery may be stopped or started, without necessarily interrupting the operation of the tractor engine.

The several reasons for, and the advantages accomplished by, my invention, will become apparent as the specification of my invention proceeds; the object of the invention being to provide means whereby the clutch lever may be operated so that the clutch may be easily moved to and retained at disengaged position, and also may as easily be released to the engaged or holding position; the operative being able to operate such means by the use of his foot, or by the use of his hand.

The present invention provides a hand-lever arm upwardly disposed and having its lower portion secured to the clutch foot-lever, and its upper portion provided with a stud, a bracket member adapted to be secured to the frame of the tractor, and a U shaped gravity dog pivoted at its body portion on said bracket and adapted to normally occupy horizontal position, there being a cam at the base of each leg, and the forward end of the upper leg being provided with a cam shaped hook, the aforesaid bracket being so positioned that the said hook is immediately at the rear of said stud, and the cams being of such form that they are engageable by the stud of the hand-lever arm when the latter is operated. With the aforesaid construction, combination and arrangement of parts, there is such operation that when the hand-lever arm is retracted the hook is raised and then dropped to holding engagement with the stud. Upon a further retractive movement of the hand-lever arm and then its release to move forwardly, the dog will have been thrown and dropped to inverted position, then re-engaged by the stud, and thence relatively slowly returned toward normal position, and at which said normal position it drops into, after the stud of the hand-lever arm will have passed to the normal forward and free position.

The objects of my invention are accomplished by, and the invention is embodied in the new construction, combination and arrangement of parts, described in the following specification, and illustrated in the accompanying drawings. The invention is defined in the appended claims. The several parts of the invention are identified by suitable characters of reference applied thereto in the different views, in the drawings, in which—

Figure 1 is a side view of my improved clutch-lever holding device.

Figure 2 is a view taken in direction of the arrow 2 in Figure 1.

Figure 3 is a side view of a tractor machine, upon which the invention is shown installed.

In a tractor of the usual type shown in Figure 3, the clutch lever A having the foot pedal A', occupies the position relative to the driver's seat B, as shown. With the said lever A at the normal or retracted position shown, the clutch is in its engaged or driving status for actuating the power transmitting connections of the driving wheels C.

My invention may be considered as an attachment adapted to be installed upon tractors already in use, or it may be made to constitute a part of the tractor structure as it is manufactured.

The hand-lever arm 1 made of cast or malleable metal has its lower portion provided with a shallow groove to fittingly engage the clutch lever A, and to which lever it is secured by bolted clamps 2. The length of said hand-lever arm is such that its handle 3 is at position easily available to the operator whether he is seated or standing. Secured to the said hand-lever arm at the suitable height shown, is a stud or projecting element 4 the function of which will presently be referred to. A link 5 is carried loosely in the end portion of the handle 3.

6 designates a bracket plate. This bracket plate, made of sheet or malleable metal about three eighths of an inch thick, is adapted to be secured to a frame part D of the tractor, by a cap screw E, and is provided with a ledge 7. This bracket plate occupies such position relative to the hand-lever arm, and its upper edge is of such formation, that an abutment 8 is provided for the stud 4 to meet when the full retractive shift of the hand-lever arm is made, as will be presently referred to.

Pivotally retained on a stud-pin 10 is a metal U shaped dog 11. The location of the bearing in the body portion of said dog is such that by gravity, it normally occupies the position shown in Figure 1. The lower leg 12 rests on the ledge 7 and it is provided with a cam $12^a$. The upper leg 13 extends forwardly, its base being provided with a cam $13^a$ and its forward portion being terminated in the form of a hook 14 having a cam face $14^a$.

The normal positions of the several parts, when the clutch of the tractor is at the engaged positions, are shown in Figure 1. The invention may be practiced by the actuation of the pedal A′ of the clutch lever, or by the actuation of the hand-lever arm 1. To practice the invention, the operator, either by drawing rearwardly the hand-lever arm 1, or by pushing forwardly the clutch lever A, causes the stud 4 to engage the cam $14^a$ (raising the dog) and to pass underneath the hook 14. In such movement, the hook drops into engagement with the said stud 4 and it holds the hand-lever against its urge to move forwardly. The said hand-lever arm being thus held, the clutch is held disengaged, the said hand-lever, and the clutch lever being at the positions shown by the dotted lines in Figure 1. The operator, being thus able to retain the clutch in disengaged position, is enabled to have the tractor in gear, and to have the engine running, and in readiness to propel the tractor, when the hand-lever arm is again operated. In working the tractor to draw the implements, such as the plow, or binder, the operator is enabled to throw in or engage the tractor clutch, either by handling the hand-lever arm directly, or by handling same by means of a line or cable attached to the link 5.

To return the tractor clutch to its engaged position, the hand-lever arm is simply drawn rearwardly from its held or dotted line position, and then permitted to spring forwardly. In this movement of the hand-lever arm, the action of the dog 11 is as follows: The stud 4, in its engagement with cam $13^a$ causes the dog to swing on its pivot to the inverted or dotted line position, as shown in Figure 1. Immediately thereafter, and as the hand-lever arm moves forwardly, the stud 4 engages the cam $12^a$; by the time the dog will have been brought about and past the point of equilibrium whence it falls to the normal position, the hand-lever arm will have advanced its full stroke, its stud 4 having been carried to position ahead or in advance of the hook 14.

The invention is economical to manufacture and to install, and is not liable to get out of order or repair. The use of same is easy to understand and much time and labor is saved to the operative who is denied the use of an assistant in operating the clutch incident to starting the travel of the tractor, when implements are being drawn and worked in the field.

I am aware that minor changes may be made in the form and details of structure, within the scope of the invention as defined by the appended claims, without departing from the spirit of the invention or sacrificing any of its advantages.

What I claim as my invention, and desire to secure by Letters Patent, is:

1. A control device of the kind described, comprising a hand-lever arm upwardly disposed and having its lower portion secured to the clutch foot-lever, and its upper portion being provided with a stud, a bracket plate adapted to be secured to the frame of the tractor, and a U shaped gravity dog pivoted at its body portion on said bracket plate and adapted to normally occupy a horizontal position, there being a cam at the base of each leg, and the forward end of the upper leg being provided with a cam nosed hook, the aforesaid bracket plate being so positioned that the said hook reposes adjacent to the stud of said hand-lever arm, and the cams being of such form that each is capable of being engaged by the stud when the hand-lever arm is operated.

2. A control device of the kind described, comprising a hand-lever arm secured to the clutch foot-lever and provided with a stud, a bracket plate adapted to be secured to the tractor frame, and a gravity dog associated with said bracket plate and adapted to be so actuated that when the hand-lever arm is moved rearwardly the stud thereof is engaged and held, cams on said dog and which are so operable by the aforesaid stud that when the said hand-lever is further retracted and released to move forwardly, the dog will have been inverted and then returned to its normal position after the hand-lever arm will have completed its movement to its normal forward or free position.

3. A holding device for a spring pressed control lever, comprising a projecting element associated with said control lever, a support element fixed on the tractor frame at position adjacent to the control lever, and a U shaped gravity dog pivoted at its body portion on said element and adapted to normally repose in horizontal position, there being a cam at the base of each leg, and the forward end of the upper leg being provided with a cam nosed hook, the cams being of such form that they are engageable by the said projecting element on said control lever when the latter is operated.

4. A clutch foot-lever holding device, comprising a hand-lever arm secured to said foot lever and being provided with a stud, a bracket plate adapted to be secured to the tractor frame and having a ledge thereon, and a U shaped dog pivoted at its body portion and having its lower leg to rest on said ledge, and the forward end of the upper leg being provided with a cam nosed hook, the said bracket plate being relatively so placed that the said hook is at position adjacent to the stud of said hand-lever arm when the latter is at the normal forward free position.

VIRGIL LOCKWOOD.